US008986101B2

(12) United States Patent
Singer et al.

(10) Patent No.: US 8,986,101 B2
(45) Date of Patent: Mar. 24, 2015

(54) GAMING DEVICE HAVING POSITIONAL SYMBOL AWARDS

(75) Inventors: Anthony Singer, Ramsey, NJ (US); Aaron Stuart Zoble, Ramsey, NJ (US)

(73) Assignee: IGT, Las Vegas, NV (US)

( * ) Notice: Subject to any disclaimer, the term of this patent is extended or adjusted under 35 U.S.C. 154(b) by 193 days.

(21) Appl. No.: 13/572,585

(22) Filed: Aug. 10, 2012

(65) Prior Publication Data

US 2013/0184048 A1 Jul. 18, 2013

Related U.S. Application Data

(60) Provisional application No. 61/522,117, filed on Aug. 10, 2011.

(51) Int. Cl.
*A63F 13/00* (2014.01)
*G07F 17/34* (2006.01)

(52) U.S. Cl.
CPC .................................... *G07F 17/34* (2013.01)
USPC .................... 463/20; 463/16; 463/25; 463/31

(58) Field of Classification Search
USPC .......................................... 463/16, 20, 25, 31
See application file for complete search history.

(56) References Cited

U.S. PATENT DOCUMENTS

| | | | |
|---|---|---|---|
| 4,198,052 | A | 4/1980 | Gauselmann |
| 4,448,419 | A | 5/1984 | Telnaes |
| 4,695,053 | A | 9/1987 | Vazquez et al. |
| 4,836,546 | A | 6/1989 | DiRe et al. |
| 4,838,552 | A | 6/1989 | Hagiwara |
| 4,874,173 | A | 10/1989 | Kishishita |
| 5,085,436 | A | 2/1992 | Bennett |
| 5,102,134 | A | 4/1992 | Smyth |
| 5,102,137 | A | 4/1992 | Ekiert |
| 5,205,555 | A | 4/1993 | Hamano |
| 5,209,479 | A | 5/1993 | Nagao et al. |
| 5,224,706 | A | 7/1993 | Bridgeman et al. |
| 5,332,219 | A | 7/1994 | Marnell et al. |
| 5,332,228 | A | 7/1994 | Schultz |

(Continued)

FOREIGN PATENT DOCUMENTS

| | | |
|---|---|---|
| AU | 74936/87 | 6/1987 |
| AU | 199717601 | 9/1997 |

(Continued)

*Primary Examiner* — James S McClellan
(74) *Attorney, Agent, or Firm* — Neal, Gerber & Eisenberg LLP

(57) ABSTRACT

Embodiments of the present invention relate to a slot machine having awards for the occurrence of certain symbols in certain designated positions of the play matrix. In one embodiment, a game device comprises: a display device; an input device; and a processor for accessing a plurality of instructions which, when executed by the processor, cause the processor to operate with the display device and the input device to: provide a game comprising: a plurality of reels, each of the reels including a plurality of symbol positions, wherein at least one of the symbol positions comprises a capture position; a plurality of symbols at the plurality of symbol positions on the reels; at least one predetermined winning symbol combination of a plurality of winning symbol combinations; and an award associated with the predetermined winning symbol combination; wherein the winning symbol combination comprises a predetermined symbol from the plurality of symbols being positioned in the capture position.

13 Claims, 13 Drawing Sheets

(56) References Cited

U.S. PATENT DOCUMENTS

| | | | |
|---|---|---|---|
| 5,342,047 | A | 8/1994 | Heidel |
| 5,393,057 | A | 2/1995 | Marnell et al. |
| 5,393,061 | A | 2/1995 | Manship et al. |
| 5,395,111 | A | 3/1995 | Inoue |
| 5,449,173 | A | 9/1995 | Thomas et al. |
| 5,569,084 | A | 10/1996 | Nicastro et al. |
| 5,580,053 | A | 12/1996 | Crouch |
| 5,584,764 | A | 12/1996 | Inoue |
| 5,609,524 | A | 3/1997 | Inoue |
| 5,611,535 | A | 3/1997 | Tiberio |
| 5,697,843 | A | 12/1997 | Manship et al. |
| 5,704,835 | A | 1/1998 | Dietz |
| 5,722,891 | A | 3/1998 | Inoue |
| 5,743,526 | A | 4/1998 | Inoue |
| 5,752,881 | A | 5/1998 | Inoue |
| 5,766,074 | A | 6/1998 | Cannon et al. |
| 5,769,716 | A | 6/1998 | Saffari et al. |
| 5,807,172 | A | 9/1998 | Piechowiak |
| 5,833,537 | A | 11/1998 | Barrie |
| 5,848,932 | A | 12/1998 | Adams |
| 5,882,261 | A | 3/1999 | Adams |
| 5,890,962 | A | 4/1999 | Takemoto |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,997,401 | A | 12/1999 | Crawford |
| 6,004,207 | A | 12/1999 | Wilson et al. |
| 6,027,115 | A | 2/2000 | Griswold et al. |
| 6,033,307 | A | 3/2000 | Vancura |
| 6,056,642 | A | 5/2000 | Bennett |
| 6,059,289 | A | 5/2000 | Vancura |
| 6,089,978 | A | 7/2000 | Adams |
| 6,093,102 | A | 7/2000 | Bennett |
| 6,095,921 | A | 8/2000 | Walker et al. |
| 6,120,031 | A | 9/2000 | Adams |
| 6,120,378 | A | 9/2000 | Moody et al. |
| 6,159,096 | A | 12/2000 | Yoseloff |
| 6,165,070 | A | 12/2000 | Nolte et al. |
| 6,190,254 | B1 | 2/2001 | Bennett |
| 6,220,959 | B1 | 4/2001 | Holmes, Jr. et al. |
| 6,234,897 | B1 | 5/2001 | Frohm et al. |
| 6,241,607 | B1 | 6/2001 | Payne et al. |
| 6,261,177 | B1 | 7/2001 | Bennett |
| 6,270,411 | B1 | 8/2001 | Gura et al. |
| 6,290,600 | B1 | 9/2001 | Glasson |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,322,078 | B1 | 11/2001 | Adams |
| 6,328,649 | B1 | 12/2001 | Randall et al. |
| 6,334,814 | B1 | 1/2002 | Adams |
| 6,346,043 | B1 | 2/2002 | Colin et al. |
| 6,358,147 | B1 | 3/2002 | Jaffe et al. |
| 6,364,766 | B1 | 4/2002 | Anderson et al. |
| 6,375,570 | B1 | 4/2002 | Poole |
| 6,409,602 | B1 | 6/2002 | Wiltshire et al. |
| 6,413,162 | B1 | 7/2002 | Baerlocher et al. |
| 6,428,412 | B1 | 8/2002 | Anderson et al. |
| 6,439,993 | B1 | 8/2002 | O'Halloran |
| 6,464,582 | B1 | 10/2002 | Baerlocher et al. |
| 6,494,454 | B2 | 12/2002 | Adams |
| 6,517,433 | B2 | 2/2003 | Loose et al. |
| 6,547,663 | B1 | 4/2003 | Dolott et al. |
| 6,551,187 | B1 | 4/2003 | Jaffe |
| 6,554,703 | B1 | 4/2003 | Bussick et al. |
| 6,554,704 | B2 | 4/2003 | Nicastro et al. |
| 6,561,900 | B1 | 5/2003 | Baerlocher et al. |
| 6,561,904 | B2 | 5/2003 | Locke et al. |
| 6,565,433 | B1 | 5/2003 | Baerlocher et al. |
| 6,569,013 | B1 | 5/2003 | Taylor |
| 6,569,015 | B1 | 5/2003 | Baerlocher et al. |
| 6,616,142 | B2 | 9/2003 | Adams |
| 6,632,139 | B1 | 10/2003 | Baerlocher |
| 6,634,945 | B2 | 10/2003 | Glavich et al. |
| 6,638,164 | B2 | 10/2003 | Randall et al. |
| 6,669,559 | B1 | 12/2003 | Baerlocher et al. |
| 6,672,960 | B1 | 1/2004 | B-Jensen |
| 6,692,355 | B2 | 2/2004 | Baerlocher et al. |
| 6,702,675 | B2 | 3/2004 | Poole et al. |
| 6,719,630 | B1 | 4/2004 | Seelig et al. |
| 6,726,563 | B1 | 4/2004 | Baerlocher et al. |
| 6,731,313 | B1 | 5/2004 | Kaminkow |
| 6,746,328 | B2 | 6/2004 | Cannon et al. |
| 6,749,502 | B2 | 6/2004 | Baerlocher |
| 6,780,109 | B2 | 8/2004 | Kaminkow |
| 6,786,818 | B1 | 9/2004 | Rothschild et al. |
| 6,793,577 | B1 | 9/2004 | Wilkins et al. |
| 6,805,349 | B2 | 10/2004 | Baerlocher et al. |
| 6,805,632 | B2 | 10/2004 | Suda |
| 6,808,454 | B2 | 10/2004 | Gerrard et al. |
| 6,840,858 | B2 | 1/2005 | Adams |
| 6,855,053 | B2 | 2/2005 | Baerlocher |
| 6,855,054 | B2 | 2/2005 | White et al. |
| 6,857,958 | B2 | 2/2005 | Osawa |
| 6,866,583 | B2 | 3/2005 | Glavich et al. |
| 6,878,061 | B2 | 4/2005 | Baerlocher et al. |
| 6,896,615 | B2 | 5/2005 | Berman |
| 6,896,617 | B2 | 5/2005 | Daly |
| 6,905,405 | B2 | 6/2005 | McClintic |
| 6,905,406 | B2 | 6/2005 | Kaminkow et al. |
| 6,918,832 | B2 | 7/2005 | Baerlocher et al. |
| 6,921,335 | B2 | 7/2005 | Rodgers et al. |
| 6,929,952 | B2 | 8/2005 | Baerlocher |
| 6,939,223 | B1 | 9/2005 | Jones |
| 6,939,229 | B2 | 9/2005 | McClintic |
| 6,960,133 | B1 | 11/2005 | Marks et al. |
| 6,964,416 | B2 | 11/2005 | McClintic et al. |
| 6,971,954 | B2 | 12/2005 | Randall |
| 6,981,635 | B1 | 1/2006 | Hughs-Baird et al. |
| 6,988,947 | B2 | 1/2006 | Baerlocher et al. |
| 6,997,808 | B2 | 2/2006 | Rodgers et al. |
| 7,001,274 | B2 | 2/2006 | Baerlocher et al. |
| 7,007,953 | B1 | 3/2006 | Cabot |
| 7,014,560 | B2 | 3/2006 | Glavich et al. |
| 7,040,983 | B2 | 5/2006 | Dolloff et al. |
| 7,056,209 | B2 | 6/2006 | Baerlocher et al. |
| 7,056,213 | B2 | 6/2006 | Ching et al. |
| 7,059,967 | B2 | 6/2006 | Baerlocher |
| 7,070,502 | B1 | 7/2006 | Bussick et al. |
| 7,074,127 | B2 | 7/2006 | Cuddy et al. |
| 7,090,580 | B2 | 8/2006 | Rodgers et al. |
| 7,094,148 | B2 | 8/2006 | Baerlocher et al. |
| 7,128,646 | B2 | 10/2006 | Baerlocher et al. |
| 7,137,888 | B2 | 11/2006 | Glavich et al. |
| 7,169,042 | B2 | 1/2007 | Muir et al. |
| 7,229,350 | B2 | 6/2007 | Baerlocher et al. |
| 7,258,611 | B2 | 8/2007 | Bigelow, Jr. et al. |
| 7,281,977 | B2 | 10/2007 | Jones |
| 7,294,055 | B2 | 11/2007 | Baerlocher et al. |
| 7,331,862 | B2 | 2/2008 | Rodgers et al. |
| 7,341,512 | B2 | 3/2008 | Dolloff et al. |
| 7,371,168 | B2 | 5/2008 | Bilyeu et al. |
| 7,371,170 | B2 | 5/2008 | Cregan et al. |
| 7,381,134 | B2 | 6/2008 | Cuddy et al. |
| 7,387,570 | B2 | 6/2008 | Randall |
| 7,399,226 | B2 | 7/2008 | Mishra |
| 7,402,102 | B2 | 7/2008 | Marks et al. |
| 7,448,948 | B2 | 11/2008 | Hughs-Baird et al. |
| 7,494,412 | B2 | 2/2009 | Baerlocher |
| 7,526,736 | B2 | 4/2009 | Kaminkow et al. |
| 7,578,737 | B2 | 8/2009 | Cregan et al. |
| 7,578,738 | B2 | 8/2009 | Cregan et al. |
| 7,585,219 | B2 | 9/2009 | Randall et al. |
| 7,591,724 | B2 | 9/2009 | Baerlocher |
| 7,666,085 | B2 | 2/2010 | Vorias et al. |
| 7,674,173 | B2 | 3/2010 | Bennett |
| 7,695,363 | B2 | 4/2010 | Gilliland et al. |
| 7,727,061 | B2 | 6/2010 | Taylor |
| 7,740,536 | B2 | 6/2010 | Pederson et al. |
| 7,775,874 | B2 | 8/2010 | Ching et al. |
| 7,837,546 | B2 * | 11/2010 | Bennett et al. .................. 463/16 |
| 7,850,521 | B2 | 12/2010 | Rodgers et al. |
| 7,922,573 | B2 | 4/2011 | Baerlocher et al. |

(56) References Cited

U.S. PATENT DOCUMENTS

| | | | |
|---|---|---|---|
| 8,002,625 | B2 | 8/2011 | Maya |
| 8,007,357 | B2 | 8/2011 | Cuddy et al. |
| 8,012,011 | B2 | 9/2011 | Baerlocher et al. |
| 8,021,226 | B2 | 9/2011 | Souza et al. |
| 8,096,877 | B2 | 1/2012 | Hoffman |
| 8,172,665 | B2 | 5/2012 | Hoffman et al. |
| 8,221,218 | B2 | 7/2012 | Gilliland et al. |
| 8,226,468 | B2 | 7/2012 | Hoffman et al. |
| 8,317,597 | B2 | 11/2012 | Taylor |
| 8,333,649 | B2 | 12/2012 | Marks et al. |
| 8,360,851 | B2 | 1/2013 | Aoki et al. |
| 8,382,574 | B2 | 2/2013 | Marks et al. |
| 8,430,737 | B2 | 4/2013 | Saunders |
| 8,430,739 | B2 | 4/2013 | Rodgers |
| 8,678,908 | B2 | 3/2014 | Nicely |
| 2002/0039920 | A1 | 4/2002 | Bryant |
| 2002/0052233 | A1 | 5/2002 | Gauselmann |
| 2002/0058545 | A1 | 5/2002 | Luciano |
| 2002/0094857 | A1 | 7/2002 | Meyer |
| 2003/0045345 | A1 | 3/2003 | Berman |
| 2003/0045354 | A1 | 3/2003 | Giobbi |
| 2003/0060267 | A1 | 3/2003 | Glavich et al. |
| 2003/0064768 | A1 | 4/2003 | Fier |
| 2003/0125105 | A1 | 7/2003 | Bennett |
| 2003/0162585 | A1 | 8/2003 | Bigelow, Jr. et al. |
| 2003/0190945 | A1 | 10/2003 | Bussick et al. |
| 2003/0203753 | A1 | 10/2003 | Muir et al. |
| 2003/0216165 | A1 | 11/2003 | Singer et al. |
| 2004/0009803 | A1 | 1/2004 | Bennett et al. |
| 2004/0023714 | A1 | 2/2004 | Asdale |
| 2004/0048650 | A1 | 3/2004 | Mierau et al. |
| 2004/0048651 | A1 | 3/2004 | Vorias et al. |
| 2004/0053677 | A1 | 3/2004 | Hughs-Baird |
| 2004/0058727 | A1 | 3/2004 | Marks et al. |
| 2004/0067790 | A1 | 4/2004 | Peterson et al. |
| 2004/0077396 | A1 | 4/2004 | Poole et al. |
| 2004/0121838 | A1 | 6/2004 | Hughs-Baird et al. |
| 2004/0171416 | A1 | 9/2004 | Baerlocher et al. |
| 2004/0171420 | A1 | 9/2004 | Baerlocher et al. |
| 2004/0185928 | A1 | 9/2004 | Baerlocher et al. |
| 2004/0192431 | A1 | 9/2004 | Singer et al. |
| 2004/0195773 | A1 | 10/2004 | Masci et al. |
| 2004/0242313 | A1 | 12/2004 | Munoz |
| 2004/0242316 | A1 | 12/2004 | Oles et al. |
| 2004/0248641 | A1 | 12/2004 | Jarvis |
| 2004/0259628 | A1 | 12/2004 | Randall |
| 2005/0020344 | A1 | 1/2005 | Kaminkow |
| 2005/0037836 | A1 | 2/2005 | Gilmore et al. |
| 2005/0043081 | A1 | 2/2005 | Baerlocher |
| 2005/0049035 | A1 | 3/2005 | Baerlocher et al. |
| 2005/0054418 | A1 | 3/2005 | Baerlocher |
| 2005/0054420 | A1 | 3/2005 | Cregan et al. |
| 2005/0054436 | A1 | 3/2005 | Frizzell et al. |
| 2005/0059477 | A1 | 3/2005 | Baerlocher |
| 2005/0059478 | A1 | 3/2005 | Peterson et al. |
| 2005/0064924 | A1 | 3/2005 | Glavich et al. |
| 2005/0071023 | A1 | 3/2005 | Gilliland et al. |
| 2005/0096121 | A1 | 5/2005 | Gilliland et al. |
| 2005/0148384 | A1 | 7/2005 | Marks et al. |
| 2005/0170876 | A1 | 8/2005 | Masci et al. |
| 2005/0192081 | A1 | 9/2005 | Marks et al. |
| 2005/0227754 | A1 | 10/2005 | Kaminkow et al. |
| 2006/0019738 | A1 | 1/2006 | Baerlocher et al. |
| 2006/0030392 | A1 | 2/2006 | Rodgers et al. |
| 2006/0063584 | A1 | 3/2006 | Brill et al. |
| 2006/0068875 | A1 | 3/2006 | Cregan et al. |
| 2006/0068883 | A1 | 3/2006 | Randall et al. |
| 2006/0073876 | A1 | 4/2006 | Cuddy |
| 2006/0073879 | A1 | 4/2006 | Baerlocher |
| 2006/0084492 | A1 | 4/2006 | Baerlocher et al. |
| 2006/0084493 | A1 | 4/2006 | Pederson et al. |
| 2006/0084494 | A1 | 4/2006 | Belger et al. |
| 2006/0084498 | A1 | 4/2006 | Baerlocher |
| 2006/0089191 | A1 | 4/2006 | Singer et al. |
| 2006/0121974 | A1 | 6/2006 | Rodgers et al. |
| 2006/0172795 | A1 | 8/2006 | Bussick et al. |
| 2006/0189364 | A1 | 8/2006 | Baerlocher |
| 2006/0199636 | A1 | 9/2006 | Ching et al. |
| 2006/0199637 | A1 | 9/2006 | Ching et al. |
| 2006/0205465 | A1 | 9/2006 | Dolloff et al. |
| 2007/0004489 | A1 | 1/2007 | Rodgers et al. |
| 2007/0010316 | A1 | 1/2007 | Baerlocher et al. |
| 2007/0021176 | A1 | 1/2007 | Jackson |
| 2007/0060248 | A1 | 3/2007 | Rodgers et al. |
| 2007/0060255 | A1 | 3/2007 | Baerlocher et al. |
| 2007/0060274 | A1 | 3/2007 | Rowe et al. |
| 2007/0281778 | A1 | 12/2007 | Bigelow et al. |
| 2008/0032783 | A1 | 2/2008 | Walker et al. |
| 2008/0045323 | A1 | 2/2008 | Berman |
| 2008/0085759 | A1 | 4/2008 | Bilyeu et al. |
| 2008/0108408 | A1 | 5/2008 | Wolf |
| 2008/0113735 | A1 | 5/2008 | Maya |
| 2008/0113739 | A1 | 5/2008 | Visser et al. |
| 2008/0132320 | A1 | 6/2008 | Rodgers |
| 2008/0139298 | A1 | 6/2008 | Rodgers et al. |
| 2008/0167125 | A1 * | 7/2008 | Dias Pires et al. .............. 463/31 |
| 2008/0182650 | A1 | 7/2008 | Randall et al. |
| 2008/0194313 | A1 | 8/2008 | Walker |
| 2008/0200237 | A1 | 8/2008 | Cuddy et al. |
| 2008/0200238 | A1 | 8/2008 | Mishra |
| 2008/0274788 | A1 * | 11/2008 | Wilson ............................ 463/20 |
| 2008/0280673 | A1 | 11/2008 | Marks et al. |
| 2009/0111559 | A1 | 4/2009 | Souza et al. |
| 2009/0118004 | A1 | 5/2009 | Hoffman |
| 2009/0124347 | A1 | 5/2009 | Rodgers et al. |
| 2010/0029364 | A1 | 2/2010 | Zielinski |
| 2010/0075741 | A1 | 3/2010 | Aoki et al. |
| 2010/0120496 | A1 | 5/2010 | Hoffman et al. |
| 2010/0120501 | A1 | 5/2010 | Hoffman et al. |
| 2010/0120507 | A1 | 5/2010 | Rodgers et al. |
| 2011/0086695 | A1 | 4/2011 | Evans |
| 2011/0098098 | A1 | 4/2011 | Stewart et al. |
| 2012/0172106 | A1 | 7/2012 | Caputo et al. |
| 2013/0053122 | A1 | 2/2013 | Spark-Stahl et al. |
| 2013/0053128 | A1 | 2/2013 | Spark-Stahl et al. |
| 2013/0095906 | A1 | 4/2013 | Marks et al. |
| 2013/0217463 | A1 | 8/2013 | Hughes et al. |
| 2013/0260855 | A1 | 10/2013 | Jackson |

FOREIGN PATENT DOCUMENTS

| | | |
|---|---|---|
| EP | 0060019 | 9/1982 |
| EP | 0410789 | 1/1991 |
| EP | 0698869 | 2/1996 |
| EP | 0984408 | 3/2000 |
| EP | 1205984 | 10/2001 |
| GB | 2106292 | 4/1983 |
| GB | 2316214 | 2/1998 |
| WO | WO 97/32285 A1 | 9/1997 |
| WO | WO 00/66235 | 11/2000 |
| WO | WO 00/76606 | 12/2000 |
| WO | WO 2005/009560 A2 | 2/2005 |
| WO | WO 2007/084766 | 7/2007 |

* cited by examiner

FIG. 3B

200

202 204

| SYMBOL COMBINATION | AWARD |
|---|---|
| A-A-A-A-A-A-A-A-A-A-A-A-A-A-A | 10,000 |
| A-A-A-A-A-A-A-A-A-A-A-A-A-A | 5,000 |
| A-A-A-A-A-A-A-A-A-A-A-A-A | 2,500 |
| A-A-A-A-A-A-A-A-A-A-A-A | 1,000 |
| A-A-A-A-A-A-A-A-A-A-A | 750 |
| A-A-A-A-A-A-A-A-A-A | 500 |
| A-A-A-A-A-A-A-A-A | 400 |
| A-A-A-A-A-A-A-A | 300 |
| A-A-A-A-A-A-A | 150 |
| A-A-A-A-A-A | 100 |
| A-A-A-A-A | 75 |
| A-A-A-A | 50 |
| A-A-A | 25 |

GAMING DEVICE HAVING POSITIONAL SYMBOL AWARDS

CROSS-REFERENCE TO RELATED APPLICATIONS

This application claims priority to U.S. Provisional Patent Application Ser. No. 61/522,117, filed Aug. 10, 2011, and titled "Gaming Device having Positional Symbol Awards," the disclosure of which is incorporated herein by reference in its entirety.

BACKGROUND

1. Field of the Invention

Embodiments of the present invention generally relate to a gaming device having positional symbol awards. More specifically, embodiments of the present invention relate to a slot machine having awards for the occurrence of certain symbols in certain designated positions of the play matrix.

2. Description of Related Art

To play a conventional slot machine, a player deposits money in the form of coins, gaming tokens or paper currency either into a coin head or bill acceptor. The coins and gaming tokens are collected in a reservoir inside the gaming machine while the paper currency is collected in the bill acceptor inside the gaming machine. If the coins, gaming tokens or paper currency are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits he wishes to wager on the next spin of the slot reels. After setting the wager, the player spins the reels by pressing the spin button or by pulling a handle. When the reels stop spinning, symbols are displayed on the slot reels. The player then collects credits for winning combinations, if any, according to a pay table. More specifically, the slot machine operates as follows:

Symbol Matrix.

Slot symbols are displayed on 3 or more slot reels (also called "columns") placed adjacent to each other. Each column contains at least 3 rows, with a symbol in each row. The resulting matrix of symbols typically ranges from 3 columns by 3 rows with 9 total symbols to 5 columns by 3 rows with 15 total symbols. Within the symbol matrix, positions on the slot reels may be referred to according to column, from left to right, and row, from the top to bottom ("symbol positions"). For example: symbol position 1/2 is located in column 1 (i.e., left-most column) and row 2 (i.e., middle row).

Winning Combinations.

Players collect credits for predetermined winning symbol combinations that appear in specific positions ("pay lines") on the slot reels. Winning combinations typically require that three or more of the same symbols appear adjacent to each other starting from the leftmost position of a pay line ("line pays"). For example: a player may collect a line pay if 3 Banana symbols appeared in symbol positions 1/1, 2/1, 3/1 on a pay line using symbol positions 1/1, 2/1, 3/1, 4/1, and 5/1.

Players may also collect credits for predetermined winning combinations that appear anywhere on a pay line ("line scatter pays") or anywhere on the slot reels ("reel scatter pays"). For example, a player may collect a line scatter pay if 3 Banana symbols appeared in symbol positions 1/1, 3/1, 5/1 on a pay line using symbol positions 1/1, 2/1, 3/1, 4/1, and 5/1; and collect a reel scatter pay if 3 Banana symbols appeared anywhere on the slot reels.

Pay Table.

Credits are awarded to the player for each winning symbol combination based on a predetermined schedule. For line pays and line scatter pays, the number of credits wagered on the winning pay line multiplies the number of credits indicated by the pay table. For example, a player may wager two credits each on five pay lines, spin the reels, and collect twice the amount indicated on the pay table for a line pay or line scatter pay appearing on any of the five played pay lines. For reel scatter pays, the total number of credits wagered multiplies the number of credits indicated by the pay table. For example, a player may wager ten total credits, spin the reels, and collect ten times the amount indicated on the pay table for a reel scatter pay appearing on anywhere on the slot reels.

Following any type of pay (e.g., line pays, line scatter pays, or reel scatter pays), credits won are added to the player's credit balance shown on the credit meter. As long as the player has credits on the credit meter, the player may continue to play the game. Following any spin, the player may collect the credit balance by pressing the Cash Out button.

While the above elements are common to many slot machine games, without more, players are often easily bored by simple conventional game play. Therefore, there is a need for a gaming apparatus having an improved game play to attract more players.

SUMMARY

Embodiments of the present invention generally relate to a gaming device having positional symbol awards. More specifically, embodiments of the present invention relate to a slot machine having awards for the occurrence of certain symbols in certain designated positions of the play matrix.

In one embodiment of the present invention, a game device comprises: a display device; an input device; and a processor for accessing a plurality of instructions which, when executed by the processor, cause the processor to operate with the display device and the input device to: provide a game comprising: a plurality of reels, each of the reels including a plurality of symbol positions, wherein at least one of the symbol positions comprises a capture position; a plurality of symbols at the plurality of symbol positions on the reels; at least one predetermined winning symbol combination of a plurality of winning symbol combinations; and an award associated with the predetermined winning symbol combination; wherein the winning symbol combination comprises a predetermined symbol from the plurality of symbols being positioned in the capture position.

In another embodiment of the present invention, a game comprises: a plurality of reels, each of the reels including a plurality of symbol positions, wherein at least one of the symbol positions comprises a capture position; a plurality of symbols at the plurality of symbol positions on the reels; at least one predetermined winning symbol combination of a plurality of winning symbol combinations; and an award associated with the predetermined winning symbol combination; wherein the winning symbol combination comprises a predetermined symbol from the plurality of symbols being positioned in the capture position.

In yet another embodiment of the present invention, a method of playing a game comprises; engaging a game device comprising: a display device; an input device; and a processor for accessing a plurality of instructions which, when executed by the processor, cause the processor to operate with the display device and the input device to: a plurality of reels, each of the reels including a plurality of symbol positions, wherein at least one of the symbol positions comprises a capture position; a plurality of symbols at the plurality of symbol positions on the reels; at least one predetermined winning symbol combination of a plurality of winning symbol combinations; and an award associated with the predetermined winning symbol combination; wherein the winning symbol combination comprises a predetermined symbol from the plurality of symbols being positioned in the capture position; instructing the input device to play the game, such instruction comprising transmitting a signal to the processor to execute the plurality of instructions in order to: activate the reels to generate one of the plurality of symbols at each of the plurality of symbol positions; and displaying an award reflective of the predetermined winning symbol combination, multiplied by the predetermined multiplier symbol amount.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein:

FIG. 3B depicts a schematic diagram illustrating an award summary table associated with the embodiment of FIG. 3A;

Figure 1A:
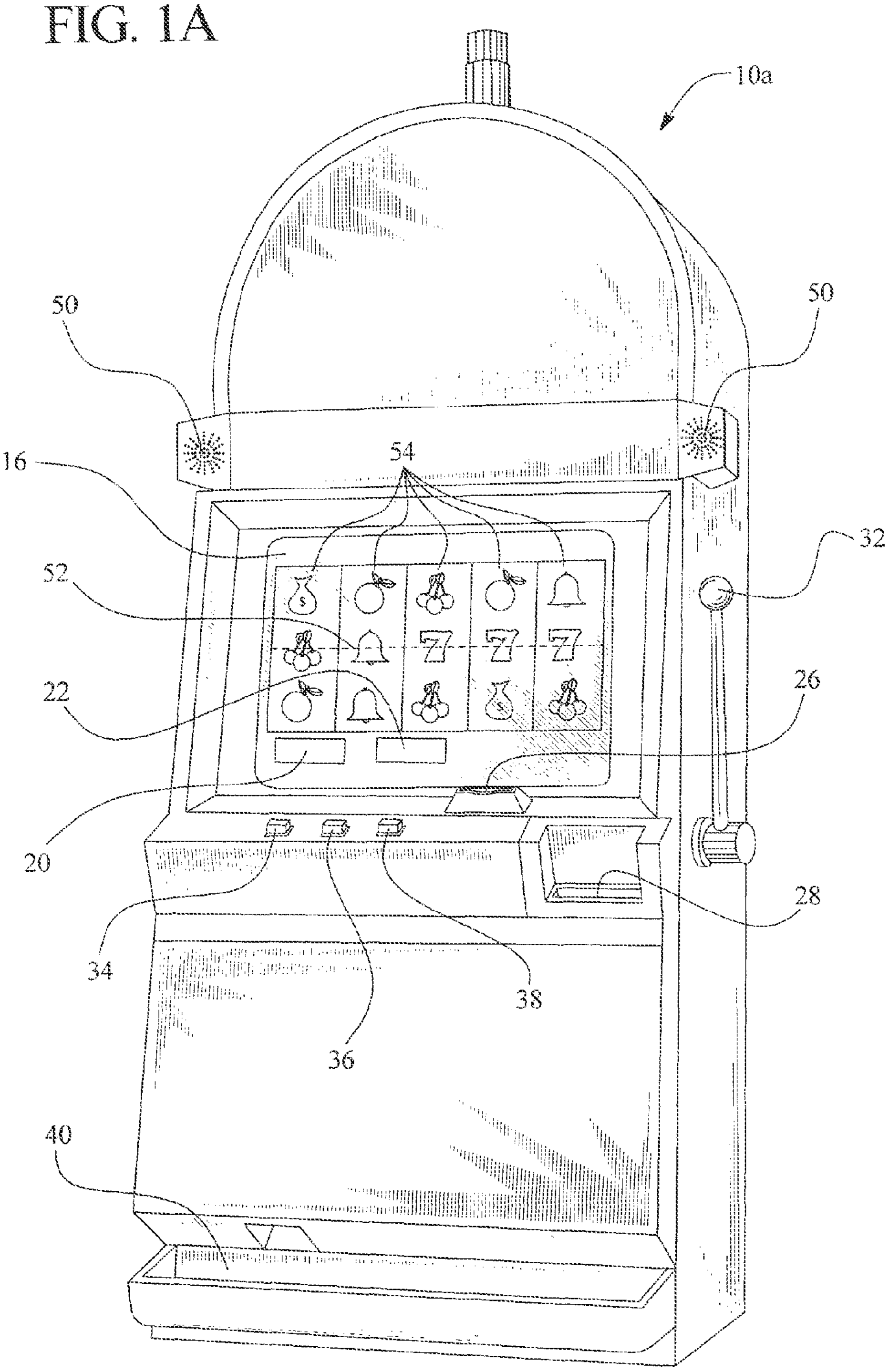
FIG. 1A depicts a front perspective view of a gaming device in the form of a slot machine in accordance with one embodiment of the present invention.

The headings used herein are for organizational purposes only and are not meant to be used to limit the scope of the description or the claims. As used throughout this application, the word "may " is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

In the following detailed description, numerous specific details are set forth in order to provide a thorough understanding of exemplary embodiments or other examples described herein. However, it will be understood that these examples may be practiced without the specific details. In other instances, well-known methods, procedures, and components have not been described in detail, so as to not obscure the following description. Furthermore, the examples disclosed herein are for exemplary purposes only and other examples may be employed in lieu of, or in combination with, the examples disclosed.

Embodiments of the present invention generally relate to a gaming device having positional symbol awards. More specifically, embodiments of the present invention relate to a slot machine having awards for the occurrence of certain symbols in certain designated positions of the play matrix.

Figure 1B:
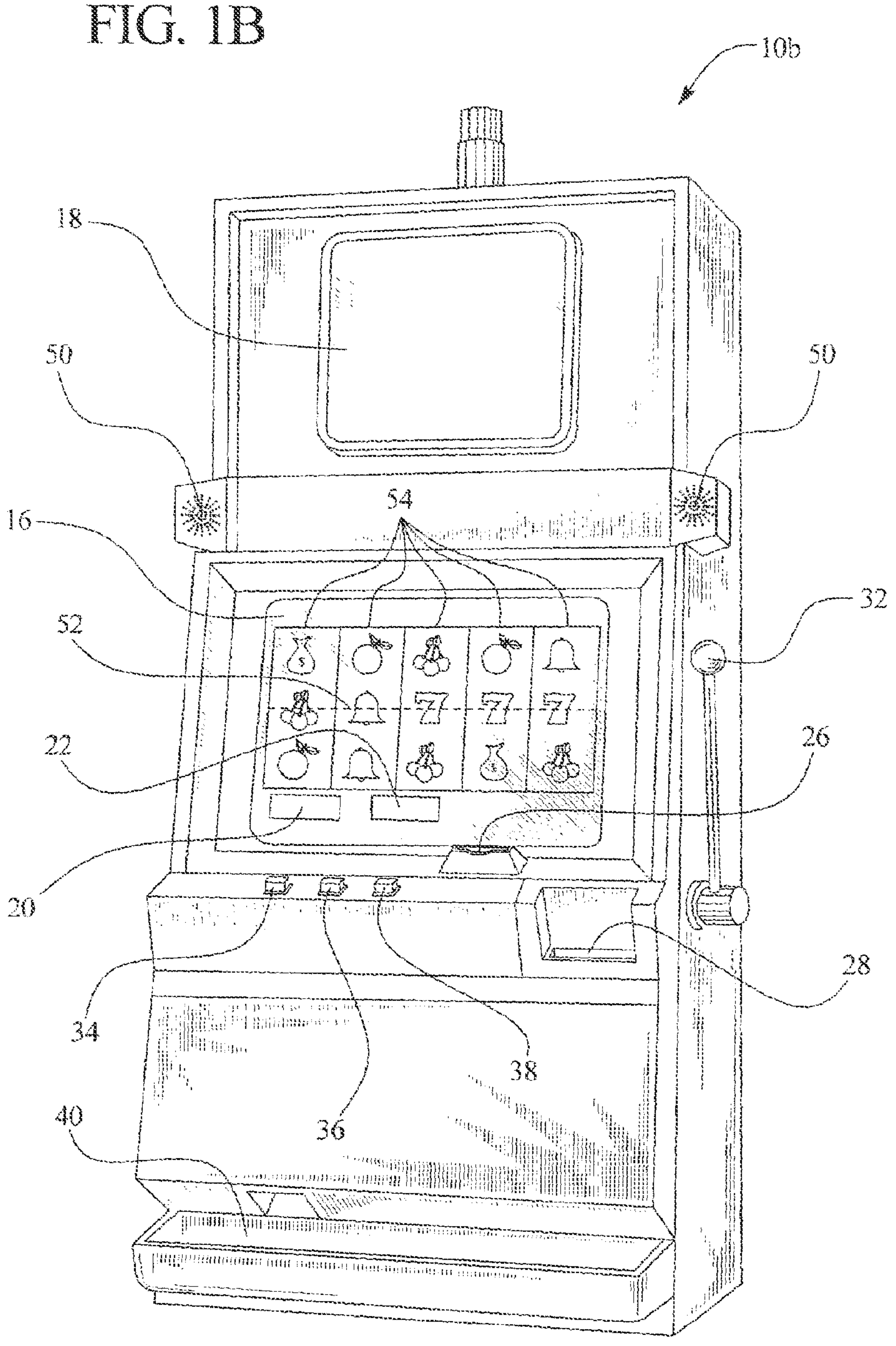
FIG. 1B depicts a front perspective view of a gaming device in the form of a slot machine in accordance with another embodiment of the present invention.

Two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 1C:
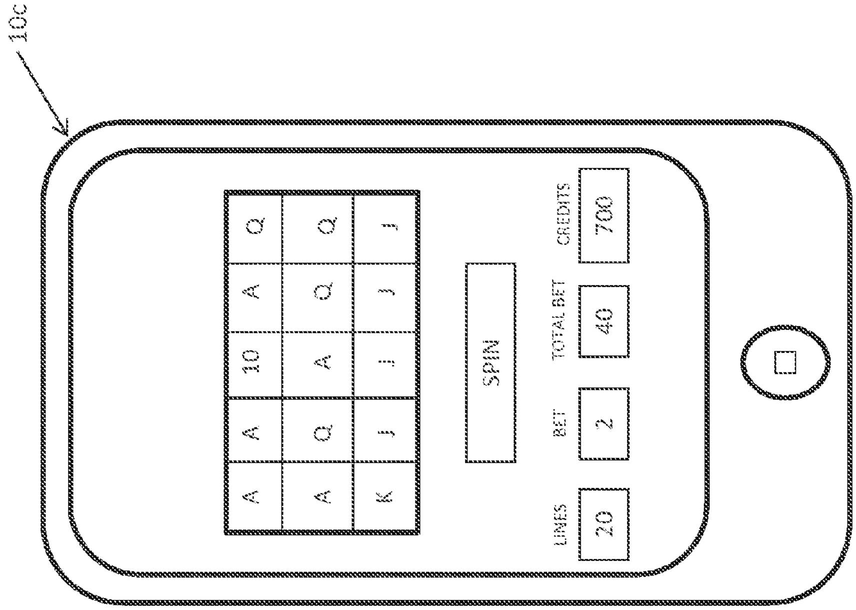
FIG. 1C depicts a front perspective view of a gaming device in the form of a mobile device in accordance with one embodiment of the present invention.
Figure 1D:
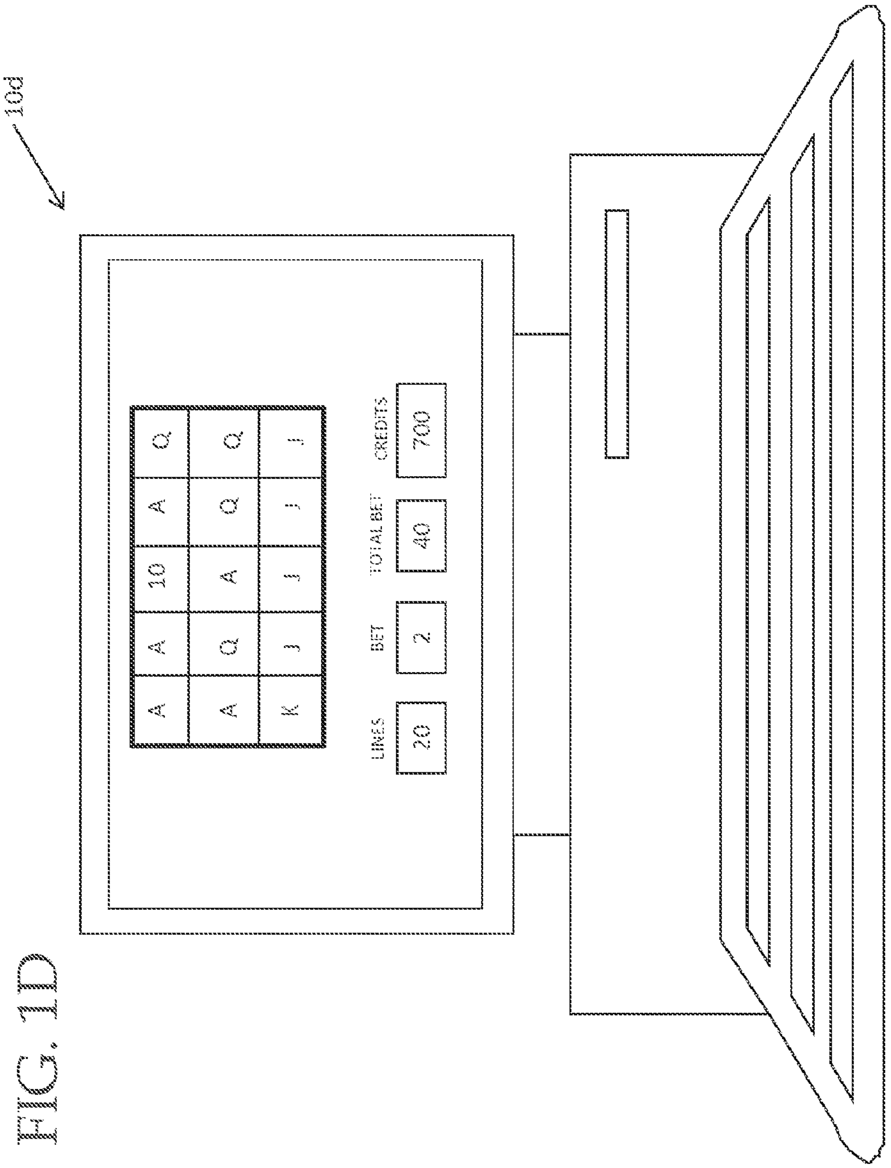
FIG. 1D depicts a front perspective view of a gaming device in the form of a personal computer in accordance with one embodiment of the present invention.
Figure 2A:
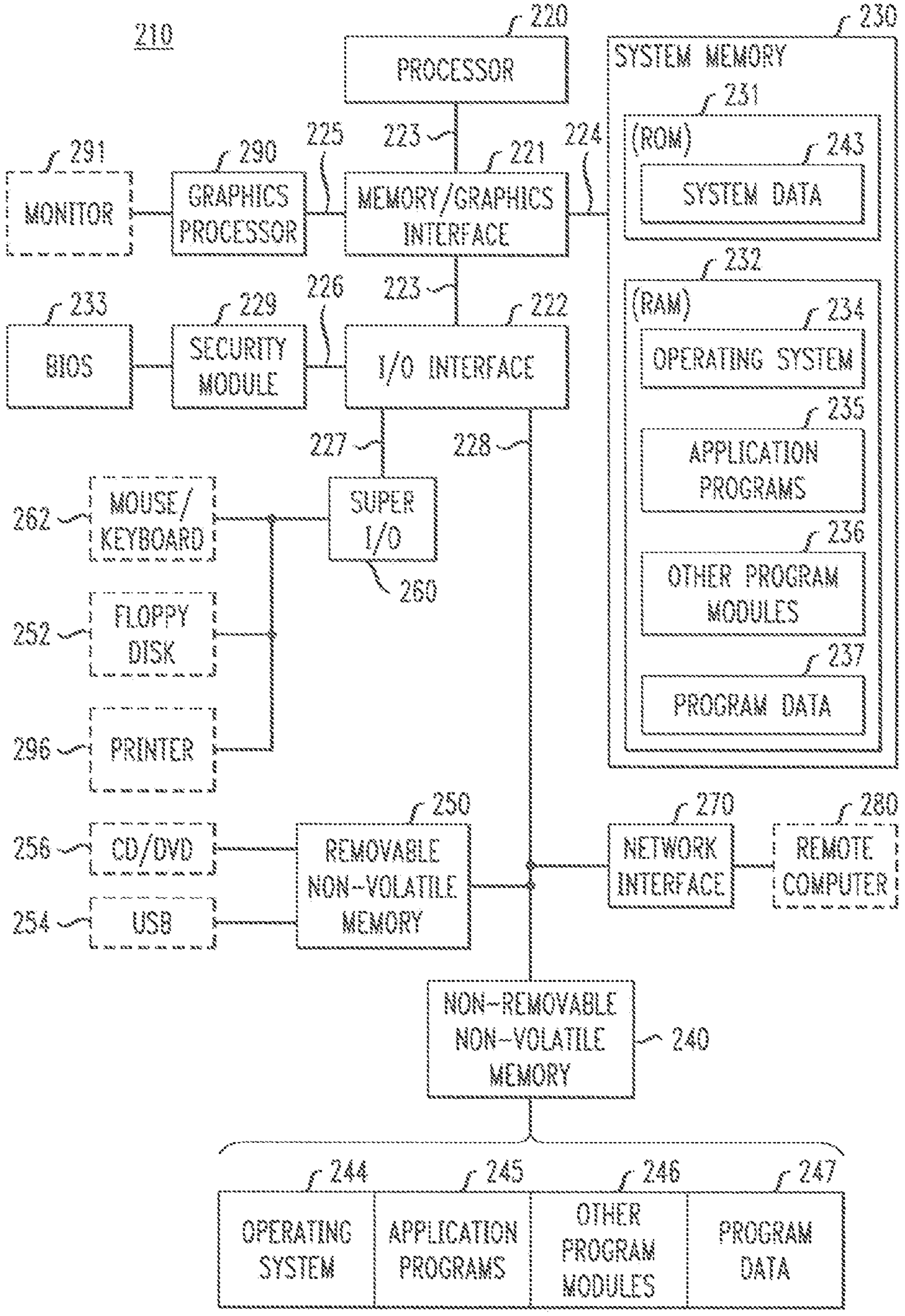
FIG. 2A depicts a schematic block diagram of a general purpose computer system, which may be used with any of the gaming devices of FIGS. 1A-1D, in accordance with embodiments of the present invention.

In several embodiments, the electronic gaming devices, for example, as shown in FIGS. 1A-1D, may comprise all or part of a general purpose computer system, for example, the general purpose computer system of FIG. 2. It should be appreciated, however, the general purpose computing system of FIG. 2 is merely an exemplary embodiment of an electronic device, and actual electronic devices may comprise any one or more components shown in FIG. 2A, suitable for embodiments of the present invention.

With reference to FIG. 2A, a general purpose computer system in the form of a computer 210 is shown. As understood by embodiments of the present invention, components shown in dashed outline are not part of the computer 210, but are used to illustrate the exemplary embodiment of FIG. 2A. Components of computer 210 may include, but are not limited to, a processor 220, a system memory 230, a memory/graphics interface 221, also known as a Northbridge chip, and an I/O interface 222, also known as a Southbridge chip. The system memory 230 and a graphics processor 290 may be coupled to the memory/graphics interface 221. A monitor 291 or other graphic output device may be coupled to the graphics processor 290.

A series of system busses may couple various system components including a high speed system bus 223 between the processor 220, the memory/graphics interface 221 and the I/O interface 222, a front-side bus 224 between the memory/graphics interface 221 and the system memory 230, and an advanced graphics processing (AGP) bus 225 between the memory/graphics interface 221 and the graphics processor 290. The system bus 223 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and can accessed by the computer 210.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. The system ROM 231 may contain permanent system data 243, such as identifying and manufacturing information. In some embodiments, a basic input/output system (BIOS) may also be stored in system ROM 231. RAM 232 typically contains data and/or program modules that are immediately accessible to and/or presently being operated on by processor 220. By way of example, and not limitation, FIG. 2 illustrates operating system 234, application programs 235, other program modules 236, and program data 237.

The I/O interface 222 may couple the system bus 223 with a number of other buses 226, 227 and 228 that couple a variety of internal and external devices to the computer 210. A serial peripheral interface (SPI) bus 226 may connect to a BIOS memory 233 containing the basic routines that help to transfer information between elements within computer 210, such as during start-up.

In some embodiments, a security module 229 may be incorporated to manage receipt of money/credits, issuance of money/credits, and enforcement of policies, as may be required in the gaming industry. In many embodiments, such security module 229 may be coupled with a payment acceptor built into a physical machine. A payment acceptor may include a coin slot and a payment, note or bill acceptor, where the player inserts money, coins or tokens. For example, the player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

A super input/output chip 260 may be used to connect to a number of 'legacy' peripherals, such as floppy disk 252, keyboard/mouse/buttons 262, and printer 296, as examples. The super I/O chip 260 may be connected to the I/O interface 222 with a low pin count (LPC) bus, in some embodiments. The super I/O chip 260 is widely available in the commercial marketplace.

In one embodiment, bus 228 may be a Peripheral Component Interconnect (PCI) bus, or a variation thereof, may be used to connect higher speed peripherals to the I/O interface 222. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 228 may be an advanced technology attachment (ATA) bus, in the form of a serial ATA bus (SATA) or parallel ATA (PATA).

The computer 210 may also include other removable/non-removable, volatile/nonvolatile computer storage media. By way of example only, FIG. 2A illustrates a hard disk drive 240 that reads from or writes to non-removable, nonvolatile magnetic media. Removable media, such as a universal serial bus (USB) memory 252 or CD/DVD drive 256 may be connected to the PCI bus 228 directly or through an interface 250. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media, discussed above and illustrated in FIG. 2A, provide storage of computer readable instructions, data structures, program modules and other data for the computer 210. In FIG. 2A, for example, hard disk drive 240 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different elements within the computer 210. A user may enter commands and information into the computer 210 through input devices such as a mouse/keyboard 262 or other input device combination. Other input devices (not shown) may include a microphone, joystick, game pad, satellite dish, scanner, or the like. These and other input devices are often connected to the processor 220 through one of the I/O interface busses, such as the SPI 226, the LPC 227, or the PCI 228, but other busses may be used. In some embodiments, other devices may be coupled to parallel ports, infrared interfaces, game ports, and the like (not depicted), via the super I/O chip 260.

The computer 210 may operate in a networked environment using logical connections to one or more remote computers, such as a remote computer 280 via a network interface controller (NIC) 270. The remote computer 280 may be a personal computer, a server, a router, a network PC, a peer device or other common network node, and typically includes many or all of the elements described above relative to the computer 210. The logical connection between the NIC 270 and the remote computer 280 depicted in FIG. 2 may include a local area network (LAN), an Ethernet-based network, a wide area network (WAN), or both, but may also include other networks. Such networking environments are commonplace in offices, enterprise-wide computer networks, intranets, and the Internet.

Returning to FIGS. 1A-1D, in one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

As shown by FIGS. 1A and 1B, and supported by the elements depicted in FIG. 2A, many embodiments of the present invention comprise at least one, and often a plurality, of input devices in communication with the processor. The input devices can include any suitable device which enables the player to produce an input signal which is read by the processor, for instructing the game and/or gaming device to do something. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, one input device is a touch-screen coupled with a touch-screen controller, or some other touch-sensitive display overlay to allow for player interaction with the images on the display. The touch-screen and the touch-screen controller are connected to a video controller. A player can make decisions and input signals into the gaming device by touching touch-screen at the appropriate places.

In one embodiment, the gaming device includes a sound generating device controlled by one or more sound cards which function in conjunction with the processor. In one embodiment, the sound generating device includes at least one and preferably a plurality of speakers or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Suitable gaming devices may incorporate any suitable wagering primary or base game. The gaming machine or device of embodiments of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into an embodiment of the present invention.

In one embodiment, a base or primary game may be a slot game with one or more paylines 52. The paylines may be horizontal, vertical, circular, diagonal, angled or any combination thereof. In this embodiment, the gaming device displays at least one and preferably a plurality of reels 54, for example, having three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which may generally correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
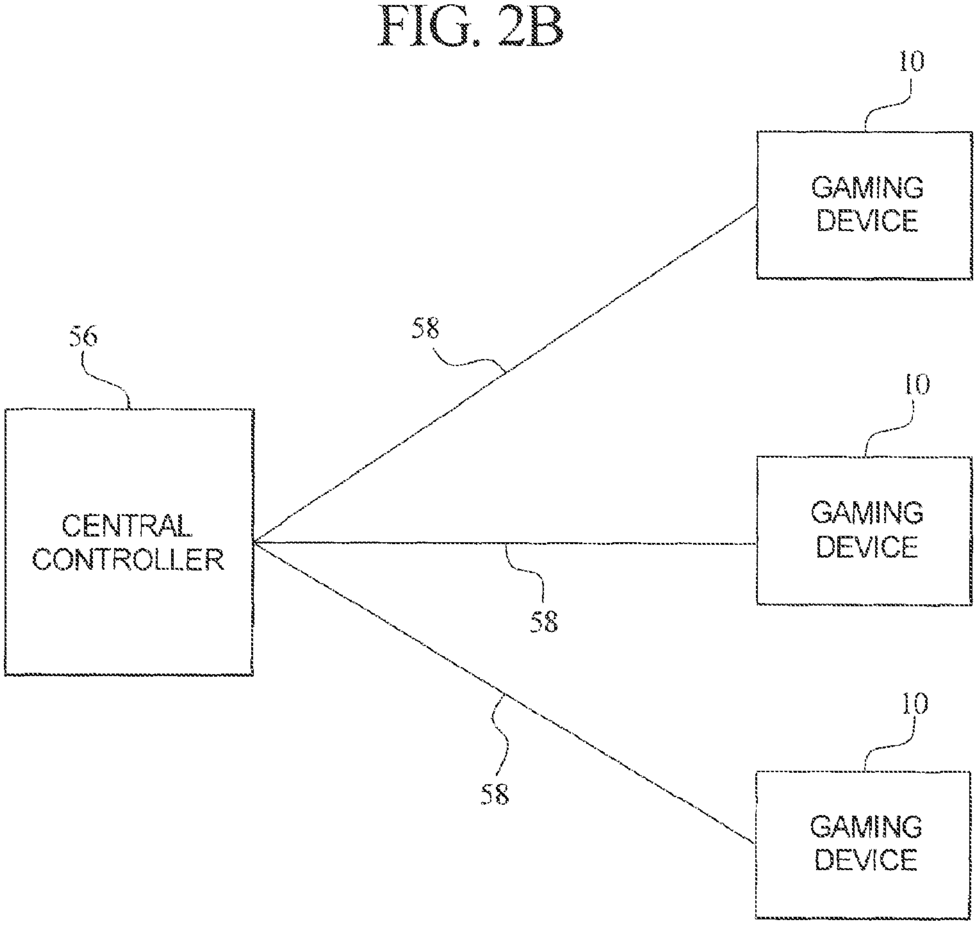
FIG. 2B depicts a schematic block diagram illustrating a plurality of gaming terminals and communication with a central controller in accordance with one embodiment of the present invention.

In one embodiment, as illustrated in FIG. 2B, one or more of the gaming devices 10 of embodiments of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of an embodiment of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is a global computer network, such as the Internet, or an intranet network, and the gaming system may be considered an online system, a mobile system, or the like. In this embodiment, the operation of the gaming device can be viewed at the gaming device with at least one web browser, or application, such that access to the data network is feasible. In this embodiment, operation of the gaming device and accumulation of credits may be accomplished with a connection to the central server or controller through a conventional phone or other data transmission line, digital signal line (DSL), T-1 line, coaxial cable, fiber optic cable, or other suitable connection. In this embodiment, players may access a game page from any location where a network connection and computer, or other gaming device 10, are available. For example, either of the gaming devices of FIGS. 1C and 1D are suitable for accessing such a data network.

The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to some embodiments of the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

In some embodiments, the data network may be integrated into an existing network platform, for example, a social networking site. For example, in one embodiment, the data network may comprise an application within a social networking site, e.g., Facebook, whereby players may access the data network via a connection to the social networking site. Such an integrated arrangement may be advantageous for applications of embodiments of the present invention that seek to have near immediate access to a significant potential customer base.

In further embodiments, the data network may be accessed via a downloadable application to a mobile device, such as a smartphone, a tablet, a mobile computer, or the like. As in known in the mobile device industry, such a downloadable application may be stored at a remote server, and upon request, a player may utilize a mobile device to download such downloadable application to be stored locally on the mobile device. Such downloadable application may access the data network through the mobile device's network connection, and provide the player a convenient means through which to access the data network. In alternative embodiments, the downloadable application may not require a network connection on a regular basis, and a game may be accessible locally on the mobile device. However, in such embodiments, some of the benefits of networked game play, such as competitions, updates, etc., may not be available until the mobile device reconnects to the data network.

Figure 3A:
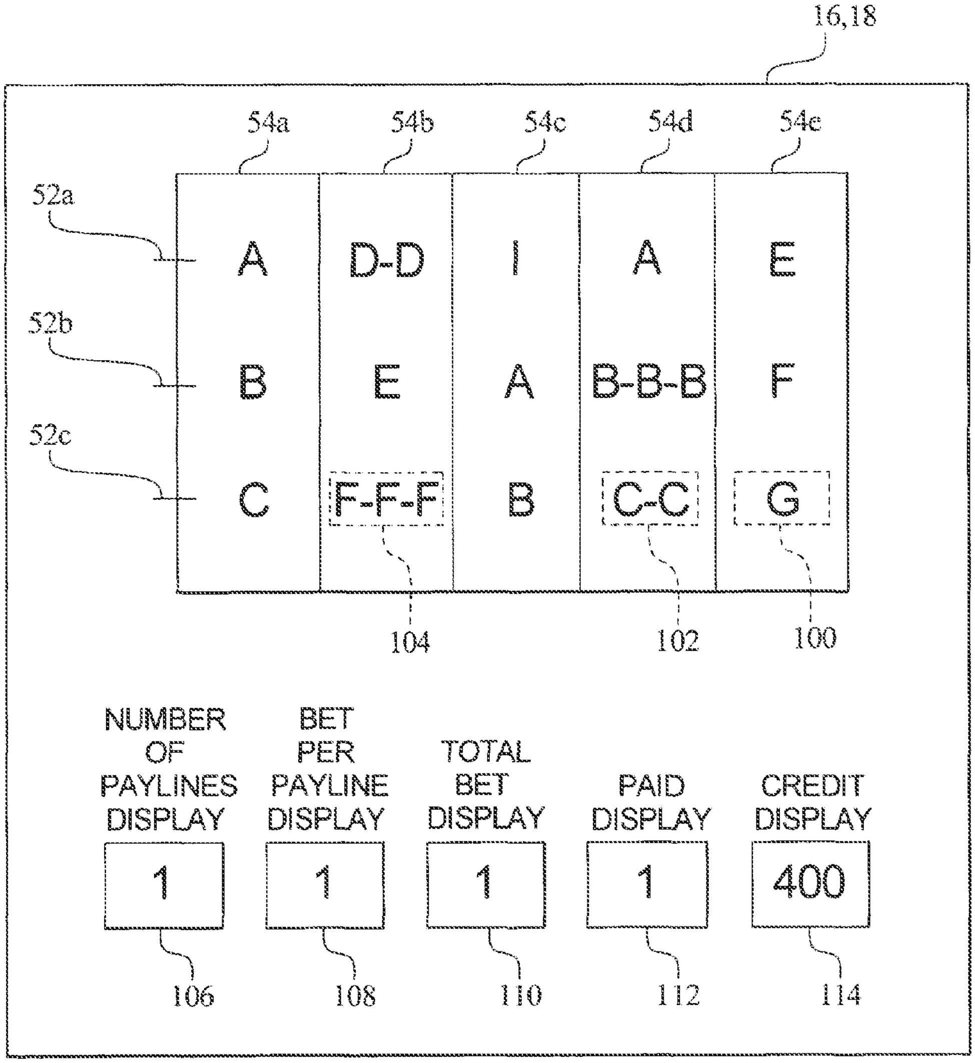
FIG. 3A depicts a front elevation view of one of the display devices, illustrating one embodiment of the present invention.

Referring now to FIG. 3A, an exemplary screen shot of a display of a gaming device is shown, in accordance with one embodiment of the present invention. As shown, a plurality of reels, such as reels 54*a*, 54*b*, 54*c*, 54*d* and 54*e*, are provided. Each of the reels 54 includes at least one, and often a plurality, of symbol positions. The symbol positions are the positions or areas on the reels where symbols are located and displayed to a player. For example, symbol position (3/2) refers to the third reel (i.e., reel 54*c*) and the second position or area on that reel (i.e., the position including the A symbol).

In this exemplary embodiment, the reels 54 include a plurality of symbols 100 which are the letters A, B, C, D, E, F, G, H and I. It should be appreciated that the reels may include any suitable symbols, characters or images as desired by the game designer. In one embodiment, each of the symbol positions on the reels includes a predetermined or designated symbol from the plurality of symbols. In another embodiment, each of the symbol positions on the reels includes a randomly determined symbol from the plurality of symbols, based on an algorithmic formula and distribution of symbols. It should be appreciated that any of the symbols may be in any of the symbol positions on the reels.

In some embodiments, the symbols 100 may optionally include at least one split symbol or replicator symbol 102 or 104, for example, as disclosed by U.S. Pat. No. 7,402,102, and incorporated by reference herein in its entirety. Each replicator symbol includes at least two symbols from the plurality of symbols at a single symbol position on the reels. For example, replicator symbol 102 includes two "C" symbols in one symbol position (4/3) on reel 54*d*. Similarly, replicator symbol 104 includes three "F" symbols at a single symbol position (2/3) on reel 54*b*. In this embodiment, each replicator symbol includes at least two of the same symbols or identical symbols at a single symbol position. In another embodiment, the replicator symbols include at least two symbols from the plurality of symbols where at least one of the symbols associated with the replicator symbol is different. The replicator symbols provide additional symbols on the reels and therefore enhance the probability that a winning symbol combination or combinations will occur on the reels. In one embodiment, the gaming device provides an outcome such as one or more awards, prizes, credits, free spins, free games, game elements or any other suitable award to a player when a designated symbol combination including at least two of the symbols is indicated in at least one of the symbol positions on the reels 54.

In one embodiment a plurality of paylines such as paylines 52*a*, 52*b* and 52*c* are associated with the reels 54. In one embodiment, the gaming device provides an outcome to the player when a designated combination of symbols such as a winning combination of symbols is indicated in at least one symbol position on one of the paylines 52*a*, 52*b* or 52*c*. In another embodiment, the gaming device provides the outcome to the player when the winning symbol combination is indicated in at least one symbol position on a pluralitiy of the paylines. In a further embodiment, the gaming device provides the outcome to the player when a winning symbol combination is indicated in at least one symbol position on any of the paylines associated with the reels. It should be appreciated that a designated combination of symbols or a winning symbol combination may be a line pay, a line scatter pay, a reel scatter pay or any suitable winning combination of the symbols.

In one embodiment, the gaming device includes a set of meters or displays used to display the relative information for the game, including the number of credits, number of pay lines, amount bet per line, total bet, and the amount paid to the player in a spin of the reels. If necessary, any number of meters may be added to further facilitate control of the games.

In another embodiment, the number of credits in the credit pool is displayed by a credit meter or credit display 114. The pool of credits increases and decreases according to the player's wins or losses in a game and may be supplemented, if necessary, by the player when the player deposits additional coins, tokens or paper currency into the gaming device.

In yet another embodiment, the number of pay lines upon which the player wagered in a game is displayed on a Number of Pay Lines meter or display 106. The pay lines are activated in a predetermined order, as follows: the first wager is applied to pay line 52*a;* the second wager is applied to pay line 52*b;* and the third wager is applied to pay line 52*c*. However, the games may have fewer or greater than three pay lines and activate the paylines in any suitable order.

In a further embodiment, the number of credits wagered on each pay line is displayed on a Bet Per Line display. In this embodiment, the same amount is wagered on each of the pay lines. Alternatively, in another embodiment the player could wager different amounts on each pay line in a game.

In one embodiment, the total number of credits bet on all of the pay lines is displayed by a Total Bet display 110. The total bet is calculated by multiplying the number of pay lines by the bet per line. In addition, the number of credits awarded for any winning symbol combinations is displayed by a Paid display 112.

In an additional embodiment, all winning combinations are defined by pay tables or award summary tables associated with a game, for example, as shown in FIG. 3B. The pay tables define the winning symbol combinations for a game such as a winning symbol combination including three or more of the same symbols on a pay line. Each symbol in a symbol position counts towards the total number of symbols on a pay line. In addition, a pay table may also define scatter awards for winning symbol combinations including symbols scattered anywhere on the reels. Alternatively, any pre-determined or designated arrangement of symbols may be defined as a winning symbol combination in a game and any suitable number of awards or credits may be provided to a player for the winning symbol combinations.

As shown in the Figure, the payout table or award summary table 200 indicates the winning symbol combinations 202 and the awards or credits associated with each of those winning symbol combinations. The award summary table 200 shows the winning symbol combinations for one of the symbols, the letter A, and the awards associated with that symbol. In this example, all of the symbols on the reels include the same winning symbol combinations and the same awards associated with those winning symbol combinations. For example, a winning symbol combination including the letter C provides the same award as a winning symbol combination including the letter A when the winning symbol combination is indicated in at least one of the symbol positions on a payline associated with the reels. It should be appreciated that the designated symbol combinations or winning symbol combinations in the game may include any suitable combination of the same symbols or different symbols in the game. In addition, it should be appreciated that the winning symbol combinations may provide any suitable awards, prizes, free games, free spins, game elements or any other suitable award, awards or outcomes in the game.

Figure 3C:
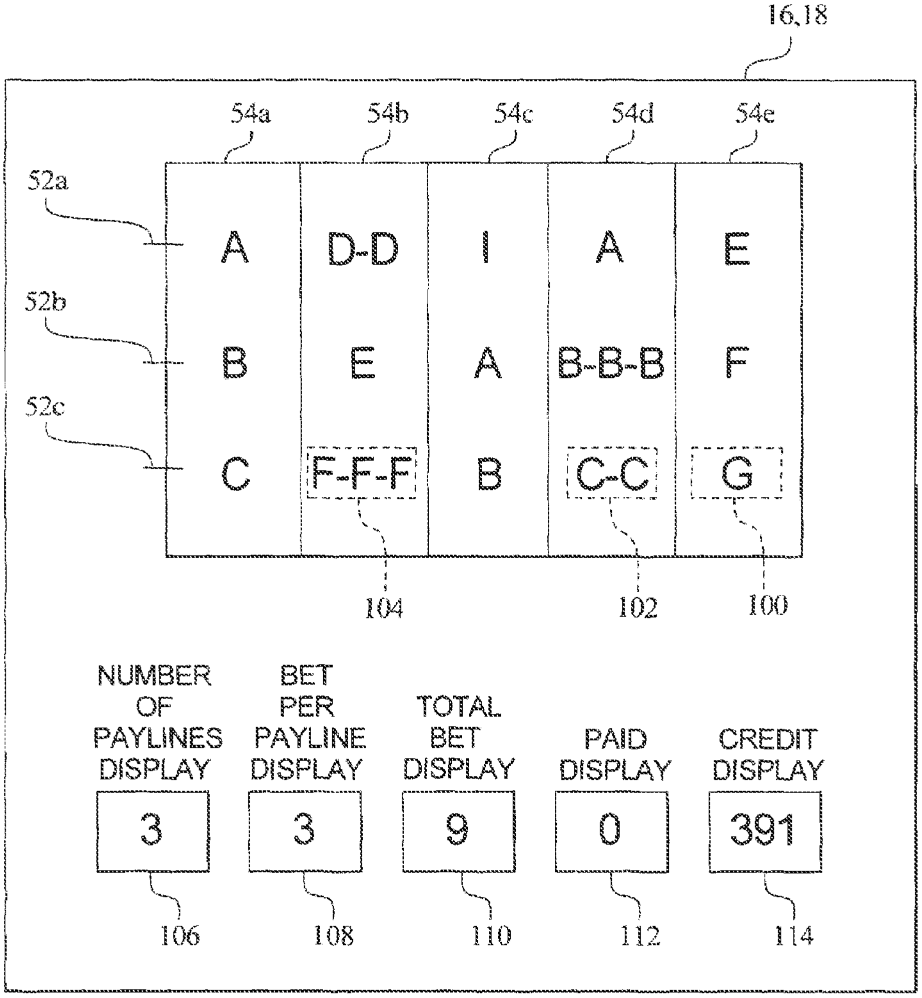
FIGS. 3C, 3D, 3E and 3F depict front elevation views of one of the display devices illustrating an example of the embodiment of FIG. 3A.
Figure 3D:
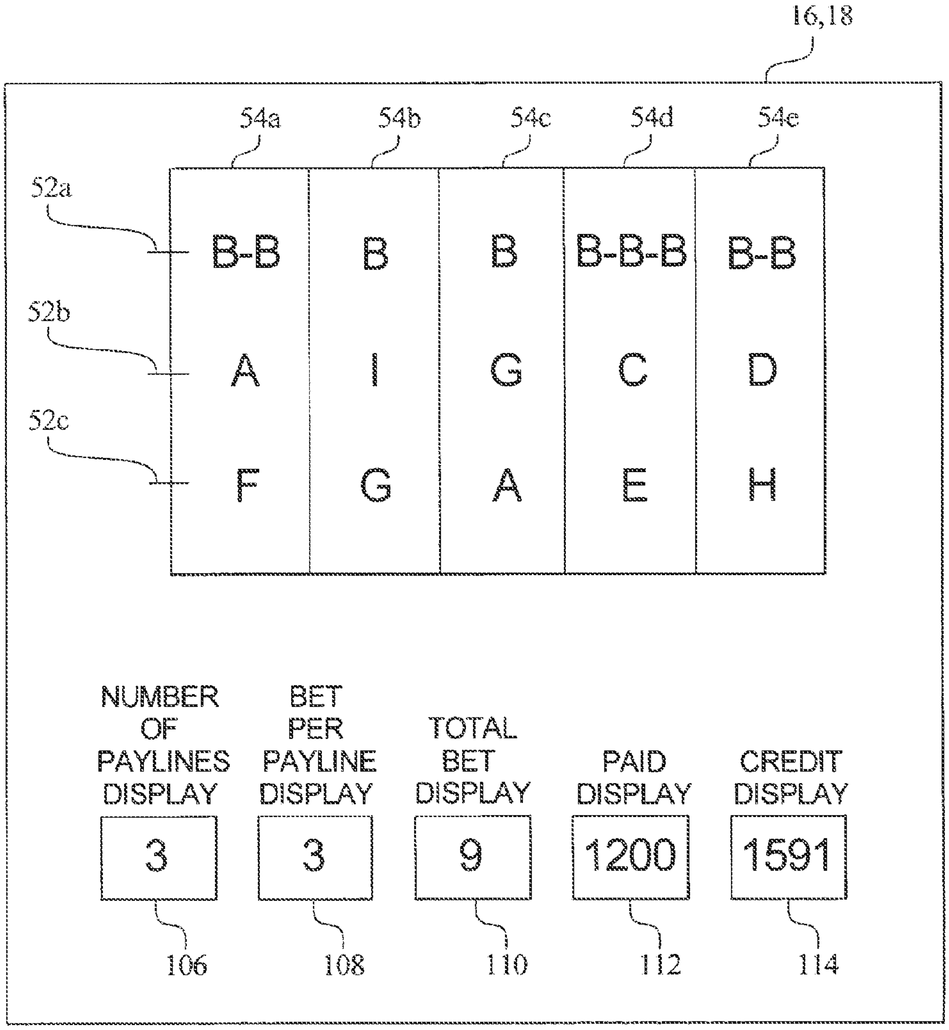
Figure 3E:
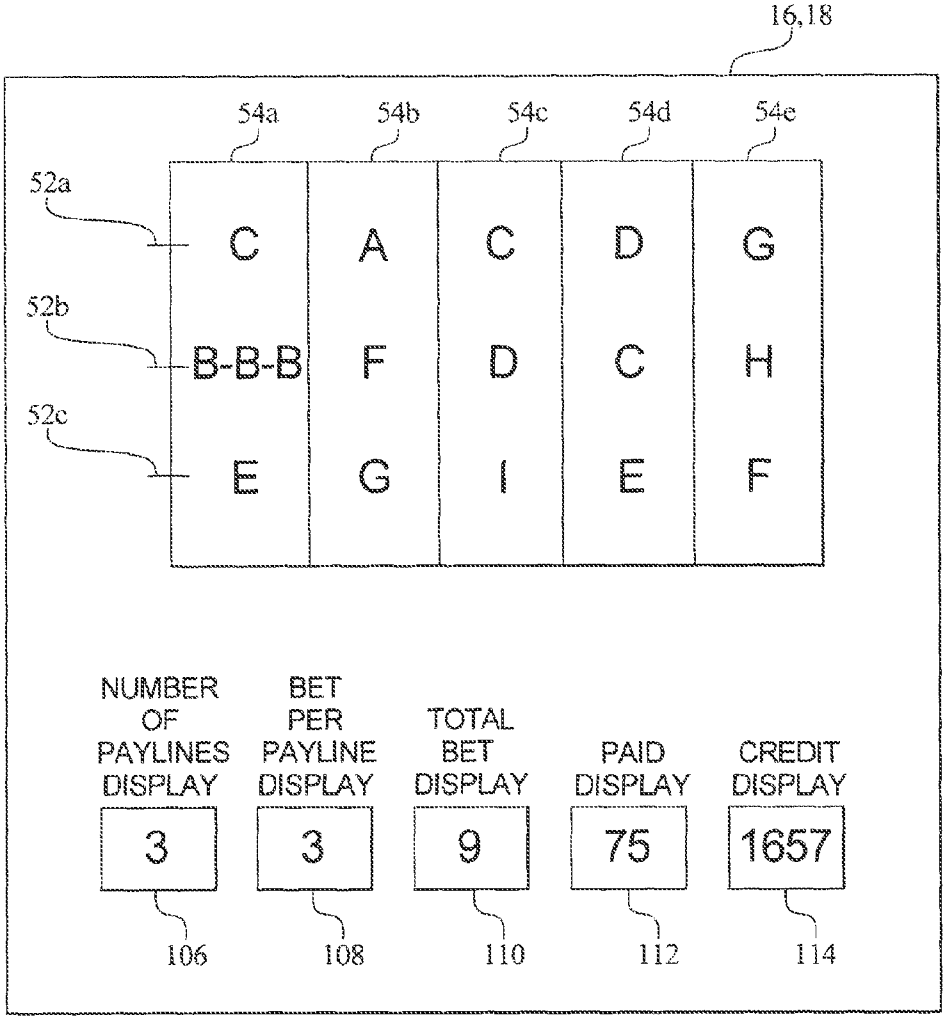

To operate and play the game, a player initially inserts currency into the game and, as shown in the exemplary embodiments of FIGS. 3A-3E, obtains a number of credits as indicated by the credit display 114. Referring to FIGS. 3C to 3E, the player begins playing the game by depressing the select paylines button to increase the number of paylines wagered in the game from one to three as indicated by the number of paylines display 106. In this example, there are three paylines 52*a*, 52*b* and 52*c* associated with the reels 54. Therefore, the player has wagered on the maximum number of paylines in the game.

Next, the player presses the bet per payline button to increase their bet or wager on each payline from one to three credits as indicated by the bet per payline display 108. Therefore, the player is wagering three credits on each of the paylines 52*a*, 52*b* and 52*c*. Based on the wager made by the player in this spin or activation of the reels in the game, the player has wagered a total bet or wager of nine as indicated by the total bet display 110. The total bet equals the number of paylines wagered on by the player of three multiplied by the amount bet per payline by the player, which is also three. Because the game has not started yet the pay display indicates a zero or that the player has not received any awards or credits in the game. The total bet of nine made by the player in this activation or spin of the reels is subtracted from the player's total credits in the game of four hundred which results in the new total number of credits being three hundred ninety-one as indicated by the credit display 114.

Referring to FIG. 3D, the gaming device or player presses or activates a play button 34 or pull arm 32 (shown in FIGS. 1A and 1B) to activate or spin the reels for the first time in the game. The reels stop and display a plurality of symbols in the symbol positions on the reels 54. Specifically, the reels or symbol matrix on the reels includes a winning symbol combination at the symbol positions on payline 52*a* associated with reels 54*a*, 54*b*, 54*c*, 54*d* and 54*e*. The winning symbol combination includes nine B symbols. The winning combination including the nine B symbols is formed by a replicator symbol including two B symbols at symbol position 1/1, a single B symbol at symbol position 2/1, another single B symbol at symbol position 3/1, a replicator symbol including three B symbols at symbol position 4/1 and a replicator symbol including two B symbols at symbol position 5/1. According to the pay table or award summary table 200 in FIG. 3B, a winning symbol combination including nine B symbols pays four hundred credits for each credit wagered upon payline 52*a*. Therefore, the spin award or award for this spin is an award of one thousand two hundred credits (i.e., four hundred credits times three credits wagered on payline 52*a*). The award of one thousand two hundred credits is added to the player's total credits and gives the player a new total number of credits of one thousand five hundred ninety-one as indicated by the credit display 114.

Referring to FIG. 3E, the gaming device or player activates or spins the reels for a second time in the game. Again, the player wagers on the maximum number of paylines, three, as indicated by the number of paylines display 106. The player also wagered or bet three credits on each of the paylines as indicated by the bet per payline display 108. Therefore, the player's total bet is nine as indicated by the total bet display 110. The total bet of nine is subtracted from the credit display shown in FIG. 3D to give the player a total number of credits before their second spin of one thousand five hundred eighty-two. The gaming device or player activates or spins the reels and when the reels stop, a plurality of symbols are indicated in the symbol positions on the reels.

Specifically, in this example, a winning symbol combination including three B symbols is indicated at symbol position 1/2 on the reels. In fact, the winning symbol combination including three B symbols includes a single replicator symbol which includes three B symbols at a single symbol position (1/2) on reel 54*a*. Therefore, the replicator symbol enables the player to obtain a winning symbol combination at a single symbol position on the reels where none of the other symbol positions on the reels combined to form a winning combination of symbols in that spin. As shown in FIG. 3B, a winning symbol combination including three B symbols provides a payout or award of twenty-five credits. Thus, the gaming device awards seventy-five credits to the player (i.e., twenty-five credits times three credits wagered on payline 54*b*). The credit meter 114 counts up from one thousand five hundred eighty-two to one thousand six hundred fifty-seven to reflect the award obtained by the player in that spin.

Figure 3F:
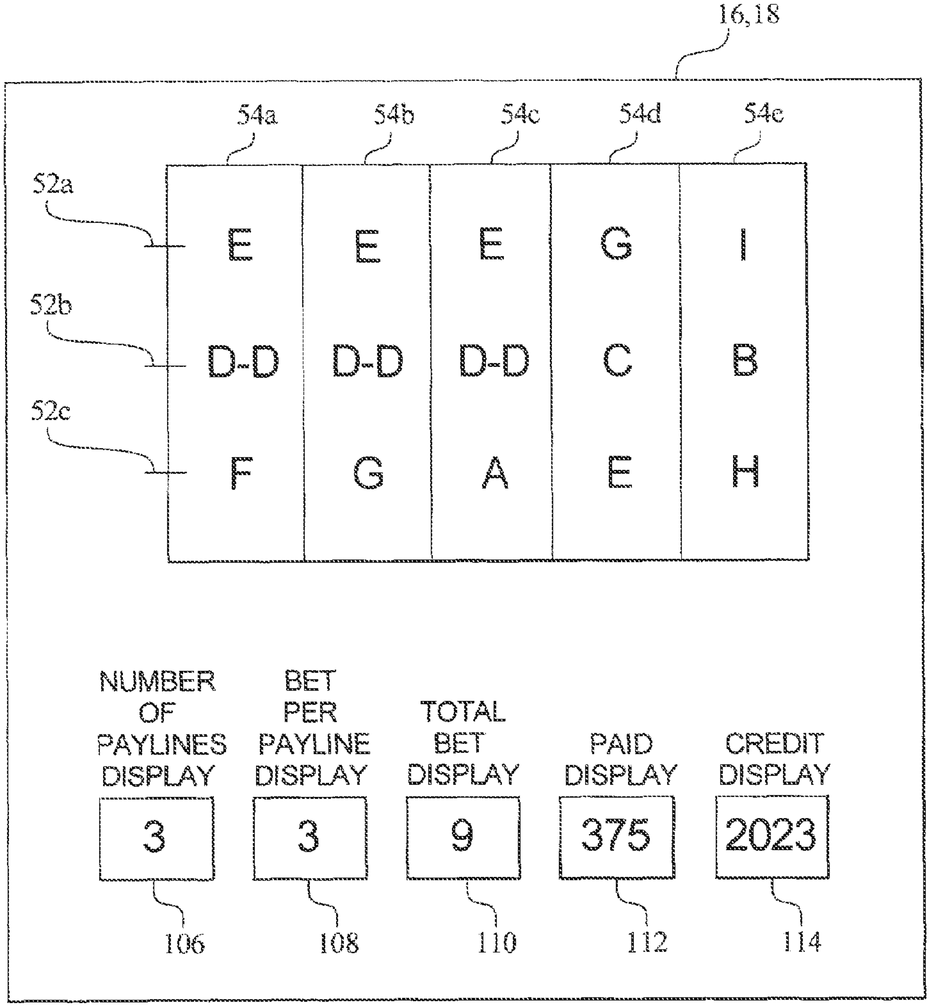

Referring to FIG. 3F, the player decides to spin the reels for a third time in the game. The player selects a maximum number of paylines, three, for the spin as indicated by the number of paylines display 106. The player also bets three credits for each of the paylines that they selected as indicated by the bet per payline display 108. Thus, the total bet made by the player for this spin is nine as indicated by the total bet display 110. The total bet of nine is subtracted from the player's total credits. The player's new total number of credits prior to this spin becomes one thousand six hundred forty-eight. The gaming device or player spins the reels for the third time in the game. The reels stops spinning and indicate a plurality of symbols at the symbol positions on the reels.

As shown in this example, winning symbol combination including three E symbols is indicated on payline 54*a* and a winning symbol combination including six D symbols is indicated on payline 54*b*. In this example, the gaming device provides awards for each winning symbol combination indicated on the reels. In another embodiment, the gaming device only provides the largest award associated with any of the winning symbol combinations indicated on the reels. It should be appreciated that the gaming device may provide one, a plurality or all of the awards associated with winning symbol combinations indicated on the reels.

In the example, the winning symbol combination including the three E symbols indicated on payline 54*b* is formed by a single E symbol at symbol position 1/1, a single E symbol at symbol position 2/1 and a single E symbol at symbol position 3/1. The winning symbol combination including six D symbols is formed by a replicator symbol including two D symbols at symbol position 1/2, a replicator symbol including two D symbols at symbol position 2/2 and a replicator symbol including two D symbols at symbol position 3/2. Therefore, the two different winning symbol combinations show how the replicator symbols may provide more winning symbol combinations and thereby more awards in a game and also how these replicator symbols may provide larger awards in the game.

Referencing back to FIG. 3B, the award or payout associated with three E symbols is twenty-five and the award associated with six D symbols is one hundred. Therefore, the total award or payout for this spin is three hundred seventy-five (i.e., twenty-five credits multiplied by three credits wagered on payline 54*a* plus 100 credits multiplied by 3 credits wagered on payline 54*b*). The total award of three hundred seventy-five is added to player's total credits in the game to give the player a new total number of credits of two thousand twenty-three as indicated by the credits displayed 114. The player decides not to continue playing the game and therefore presses the cash out button to receive the total number of credits of two thousand twenty-three as indicated by the credit display 114.

Figure 4:
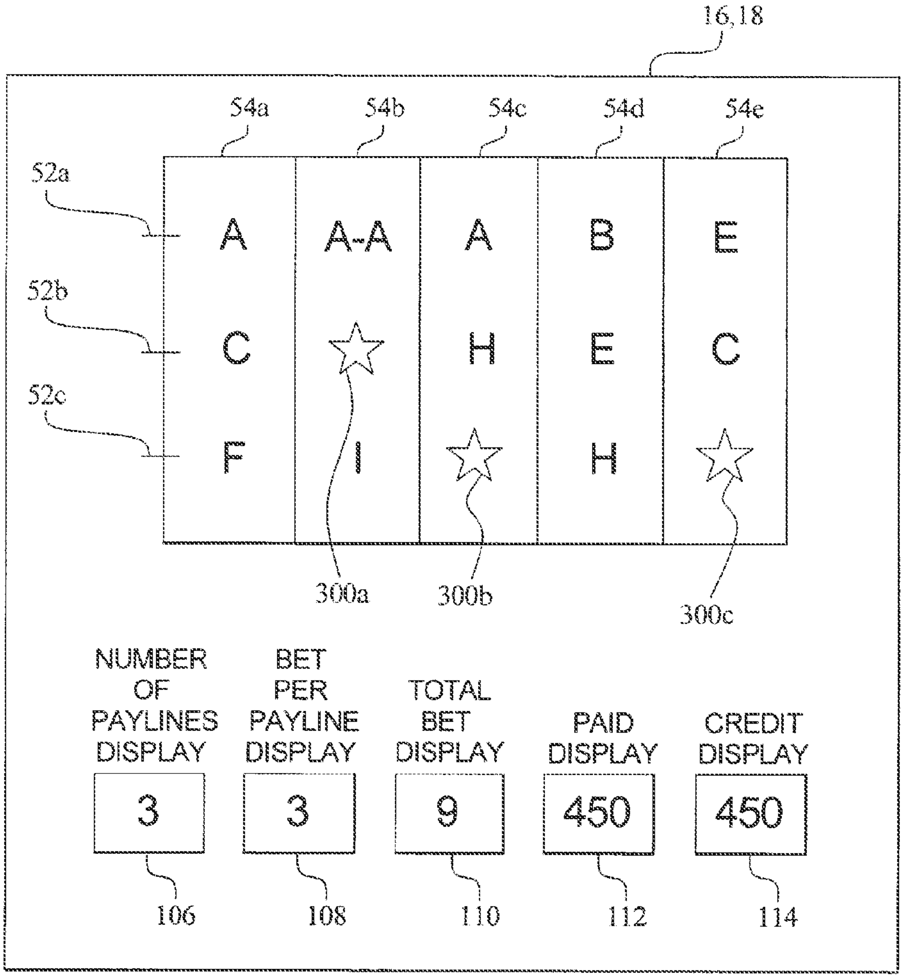
FIG. 4 depicts a front elevation view of one of the display devices in accordance with another embodiment of the present invention, where the symbols on the reels include a plurality of bonus symbols.

FIG. 4 depicts another embodiment of the present invention where the symbols include at least one bonus symbol. In one embodiment, the gaming device provides a bonus outcome such as a bonus award to the player when at least two of the bonus symbols are indicated in at least one symbol position on a payline associated with the reels. In another embodiment, the gaming device provides the bonus outcome to the player when at least two of the bonus symbols are indicated in at least one symbol position on any of the paylines or in a scatter position associated with the reels. The bonus symbol provides the player with an additional outcome or outcomes in a game such as an additional award or awards, which increases the player's excitement and enjoyment of the game. It should be appreciated that the bonus symbol may be any suitable symbol, character or image desired by the game implementer. It should also be appreciated that the bonus outcome may include awards, prizes, credits, free spins, free games, game elements or any other suitable outcome.

As shown in the exemplary embodiment, three bonus symbols 300*a*, 300*b* and 300*c* are indicated at three different symbol positions on the reels 54. Specifically, bonus symbol 300*a* is indicated at symbol position 2/2, bonus symbol 300*b* is indicated at symbol position 3/3 and bonus symbol 300*c* is indicated at symbol position 5/3. In this example, three bonus symbols indicated in at least one symbol position on any of the paylines associated with the reels provides a bonus outcome including a multiplier of 3.times. Therefore, any outcomes obtained by the player are modified by the multiplier associated with the winning bonus symbols combination.

In this example, the reels indicate a winning symbol combination including four A symbols on payline 54*a*. This winning symbol combination is formed by a single A symbol at symbol position 1/1, a replicator symbol including two A symbols at symbol position 2/1 and a single A symbol indicated at symbol position 3/1. As illustrated above, the replicator symbol increases the number of symbols in the winning symbol combination and therefore provides the player with a larger award. The winning symbol combination including four A symbols provides an award of fifty as indicated by the award table 200 in FIG. 3B. Therefore, the award of fifty is multiplied by the bet per payline of three as indicated in the bet per payline display 108 to provide the player with an award associated with this spin of one hundred fifty. The spin award of one hundred fifty is multiplied by the bonus outcome or multiplier 3.times. to provide a total award for this spin of four hundred fifty as indicated in the paid display 112. Because the player did not obtain any awards previously in the game, the player's total number of credits or total award is four hundred fifty as indicated by the credit display 114.

In accordance with embodiments of the present invention, the games described herein may further comprise that a number of free spins are awarded to the player via any means suitable for embodiments of the present invention. Such awarding of free spins can occur via any of the means known in the industry, for example, as disclosed by U.S. Pat. No. 7,887,407, the disclosure of which is incorporated herein by reference in its entirety.

Generally, a position in the play matrix is designated as the capture position. If, at any time, any of certain predetermined symbols land in the capture position, an award is issued according to a table of awards which depends on the symbol as well as the number of times the symbol was captured previously.

In another embodiment, multiple positions in the play matrix may be designated as capture positions. Similarly, in other embodiments, new positions in the play matrix may become capture positions over the course of the free spins.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. For example, an element disclosed by one embodiment of the present invention may be included in any other disclosed embodiment, where suitable. All such modifications and variations are intended to be included herein within the scope of this disclosure and the present invention.

What is claimed is:

1. A gaming device comprising:

a display device;

an input device; and a processor for accessing a plurality of instructions which, when executed by the processor, cause the processor to operate with the display device and the input device to, for a play of a game:

(a) receive at least one wager on at least one payline;

(b) at each of a plurality of symbol positions of a plurality of reels, display a symbol selected from a plurality of symbols, wherein at least one of the symbol positions includes a capture symbol position and the plurality of symbols includes a predetermined symbol;

(c) if the predetermined symbol is not displayed at the capture symbol position, for each wagered on payline:

(i) determine any awards associated with any winning symbol combinations formed from the plurality of symbols displayed along said wagered on payline, wherein said determination is based on a first paytable, and (ii) display any determined awards associated with any formed winning symbol combinations; and (d) if the predetermined symbol is displayed at the capture symbol position, for each wagered on payline:

(i) determine any awards associated with the any winning symbol combinations formed from the plurality of displayed symbols, wherein said determination is based on a second, different paytable, and (ii) display any determined awards associated with any formed winning symbol combinations.

2. The gaming device of claim 1, wherein when executed by the processor, the plurality of instructions cause the processor to determine the second, different paytable based on a quantity of times the predetermined symbol was previously displayed at the capture symbol position.

3. The gaming device of claim 1, wherein when executed by the processor, the plurality of instructions cause the processor to determine any winning symbol combinations based on at least one selected from the group consisting of: a random determination, a pre-determination and a determination based on the wager.

4. The gaming device of claim 1, wherein the plurality of symbols include at least one bonus symbol.

5. The gaming device of claim 4, wherein when executed by the processor the plurality of instructions cause the processor to provide at least one bonus award when a displayed winning symbol combination including the bonus symbol.

6. The gaming device of claim 1, wherein the game is played on a slot machine.

7. The gaming device of claim 1, wherein a plurality of the symbol positions include capture symbol positions.

8. A gaming device comprising:

a display device;

an input device; and a processor for accessing a plurality of instructions which, when executed by the processor cause the processor to operate with the display device and the input device to for a play of a game:

(a) receive a wager on a payline;, (b) at each of a plurality of symbol positions of a plurality of reels display a symbol selected from a plurality of symbols, wherein at least one of the symbol positions includes a capture symbol position and the plurality of symbols includes a predetermined symbol;

(c) if the symbols displayed along said wagered on a payline form a predetermined winning symbol combination and the predetermined symbol is not displayed at the capture symbol position:

(i) determine a first award associated with the formed predetermined winning symbol combination, wherein said determination is based on a first paytable, and (ii) display the determined first award associated with the predetermined winning symbol combination;

(d) if the symbols displayed along said wagered on a payline form the predetermined winning symbol combination and the predetermined symbol is displayed at the capture symbol position:

(i) determine a second different award associated with the formed predetermined winning symbol combination, wherein said determination is based on a second, different paytable, and (ii) display the determined second award associated with the predetermined winning symbol combination.

9. The gaming device of claim 8, wherein when executed by the processor the plurality of instructions cause the processor to determine the second, different paytable based on a quantity of times the predetermined symbol was previously displayed at the capture symbol position.

10. The gaming device of claim 8, wherein when executed by the processor the plurality of instructions cause the processor to determine the predetermined winning symbol combination based on at least one selected from the group consisting of: a random determination, a pre-determination and a determination based on the wager.

11. The game gaming device of claim 8, wherein the plurality of symbols include at least one bonus symbol.

12. The gaming device of claim 11, wherein when executed by the processor, the plurality of instructions cause the processor to provide at least one bonus award when the predetermined winning symbol combination includes the bonus symbol.

13. The gaming device of claim 8, wherein the game is played on a slot machine.

* * * * *

UNITED STATES PATENT AND TRADEMARK OFFICE
CERTIFICATE OF CORRECTION

PATENT NO. : 8,986,101 B2
APPLICATION NO. : 13/572585
DATED : March 24, 2015
INVENTOR(S) : Anthony Singer et al.

It is certified that error appears in the above-identified patent and that said Letters Patent is hereby corrected as shown below:

IN THE CLAIMS

In Claim 5, Column 18, Line 31, replace “including” with --includes--.
In Claim 8, Column 18, Line 44, delete “.”.
In Claim 8, Column 18, Line 50, delete “a”.
In Claim 8, Column 18, Line 60, replace “a” with --and--.

Signed and Sealed this
Fifth Day of April, 2016

Michelle K. Lee

Michelle K. Lee
*Director of the United States Patent and Trademark Office*